United States Patent Office 2,938,011
Patented May 24, 1960

2,938,011

LOW SHRINKAGE SILICONE RUBBER COMPOSITION CONTAINING A MIXTURE OF FILLERS

Wilbur J. Wormuth, Schenectady, N.Y., assignor to General Electric Company, a corporation of New York No Drawing. Filed July 13, 1956, Ser. No. 597,577

2 Claims. (Cl. 260—37)

This invention is concerned with a filled organopolysiloxane convertible to the cured, solid, elastic state which shows a minimum of shinkage during molding. More particularly, the invention relates to a heat-curable composition of matter composed, by weight, of (1) 100 parts of a methyl vinylpolysiloxane convertible to the cured, solid, elastic state containing about 2.0 to 2.005 total methyl and vinyl groups, from about 0.05 to 2% of the silicon atoms being connected to at least one and not more than two vinyl radicals by a carbon-silicon linkage, (2) a finely divided mixture of silica fillers composed of (a) a precipitated silica having an average particle diameter of from 20 to 25 millimicrons and a surface area of about 140 to 160 square meters per gram, and (b) a diatomaceous earth having an average particle diameter of between 1000 to 6000 millimicrons and having a surface area of about 15 to 30 square meters per gram, the total filler content comprising from 75 to 150 parts, the diatomaceous earth being present in an amount equal to from about 60 to 85% of the weight of the precipitated silica, the said filler content and proportions of filler varying with the durometer requirements of the cured product, and (3) from 0.5 to 2 parts bis-(2,4-dichlorobenzoyl) peroxide.

In the molding of certain silicone rubber products, particularly rings used as gaskets, etc., it has been found necessary, due to the large shrinkage (usually around 6% or more) of the usual silicone rubber during the molding technique to make allowances for any changes in tolerances in the dimensions of the gasket. Often this is very difficult because the dimensional stability will vary with the type of polymer, the type of filler, the mold, etc. Because of this variation, it has been almost impossible to employ for molding silicone rubber, molds which have been used in the past for molding other synthetic rubber such as hydrocarbon rubbers, for instance, copolymers of butadiene and styrene, copolymers of butadiene and acrylonitrile, natural rubber, etc., which have linear shrinkages of the order of about 1.6 to 1.8%. This, of course, is undesirable because scrap losses, as well as the difficulty in taking into account any changes in dimensions of the molded product from the time it is put into the mold until the time it is finally molded. In addition, special molds have had to be prepared for molding silicone rubber since molds which may have made for use in the usual rubber molding art have been unacceptable.

Unexpectedly, I have discovered that a specific combination of ingredients employing a special mixture of fillers and a certain curing agent in combination with a methyl vinyl gum convertible to the cured, solid, elastic state can be employed as a molding composition which, when molded in the usual fashion, results in a product whose linear shrinkage is essentially equivalent to the linear shrinkage of previously known organic rubbers, particularly the hydrocarbon type of rubbers mentioned above, that is, those other than silicone rubbers. These compositions have been so uniform in their low shrinkage that in the molding of about 2,000 O-rings from the above described filled methyl vinylpolysiloxane, every molded sample had the same dimensions as 2,000 other samples molded in the same mold using a butadiene-acrylonitrile copolymer.

The organopolysiloxane gum convertible to the cured, solid, elastic state employed in the practice of my invention is a methyl vinylpolysiloxane containing about 2 to 2.005 total methyl and vinyl groups, from 0.05 to 2% of the silicon atoms of the organopolysiloxane being substituted with vinyl radicals. Examples of such methyl vinyl polysiloxanes which may be employed as well as methods for preparing the same are described in Marsden Patent 2,445,794, which by reference is made part of the present disclosures. More specifically, such heat-convertible methyl vinylpolysiloxane can be obtained by intercondensing octamethylcyclotetrasiloxane with tetramethyl tetravinylcyclotetrasiloxane in such proportions that the number of vinyl groups on silicon is within the range described above. Such interpolymerization can be effected by means of small concentrations of potassium hydroxide, cesium hydroxide, etc. The amount of interpolymerization catalyst used is relatively small and, depending on the type of interpolymerization catalyst used, may range from 0.001 to 0.1%, by weight, based on the total weight of the polysiloxanes.

The particular combination of fillers employed includes a precipitated silica having an average particle diameter of about 20 to 25 millimicrons and a surface area of about 140 to 160 square meters per gram. Such a material is Hi-Sil X303, a precipitated silica manufactured by Columbia-Southern Chemical Corporation, Barberton, Ohio. It is generally prepared by adjusting the pH of an aqueous solution of sodium silicate and precipitating the silica with an acid, e.g., hydrochloric acid. This finely divided filler has a pH of from about 7.0 to 8.0.

The other finely divided silica filler employed is of somewhat larger average particle size diameter and ranges from about 1,000 to 6,000 millimicrons. This material has a pH of about 7.0 to 8.5. An example of such a silica is diatomaceous earth sold as Celite 270, Celite 350, Celite Superfloss, etc., by Johns-Manville Products Corporation, Maplewood and Craft Streets, Albany, New York.

The catalyst specifically employed in the practice of the present invention which has been found to give optimum shrinkage characteristics is bis-(2,4-dichlorobenzoyl) peroxide. It is important that this catalyst be employed and is preferably present, by weight, in an amount equal to from 0.5 to 2 parts of the latter per 100 parts of the convertible methyl vinylpolysiloxane. In general, this is the only catalyst or curing agent for the methyl vinylpolysiloxane required to effect curing of the latter, and is satisfactory for most stocks of cured silicone rubber over a wide range of durometers ranging from about 50 to 80 on the Shore durometer A scale. It has been found that in the higher durometer range, for instance, durometers at around 80, the bis-(2,4-dichlorobenzoyl) peroxide is the only catalyst required and the desired durometer hardness will be obtained provided the molding composition is molded shortly after the ingredients are mixed together. If the mixture of ingredients is stored for any length of time, for instance, from several days to several months, it will be found that there is a tendency for the durometer of the molded products to drift downward and decrease with increased storage of the moldable material. Thus, whereas a durometer of 80 can be obtained if the molding is carried out promptly after mixing the ingredients, if the moldable mixture of ingredients is allowed to stand for eight to ten days, it will be found that the durometer of the molded product may be 75 or even as low as 65. In order to avoid this undesirable change in durometer hardness, I have found that the incorporation of another curing agent, specifically benzoyl peroxide, in an amount equal to from 0.05 to 1 part thereof per 100 parts of the convertible methyl vinylpolysiloxane, in combination with bis-(2,4-dichlorobenzoyl) peroxide, markedly reduces and in some instances completely eliminates this tendency to change in durometer.

In order to prepare the moldable compositions, it is only necessary to mix the ingredients together described above with the bis-(2,4-dichlorobenzoyl) peroxide on the usual rubber compounding mill, and thereafter molding the same at a temperature of about 140° to 200° C. for times ranging from about 5 to 30 minutes or more. After the molding operation, it is usually desirable to further heat-age the molded product at a temperature, for instance, from 150° to 300° C. for times ranging from a few minutes to as long as 24 hours or more to obtain the ultimate cure.

For minimum shrinkage (e.g., from 1.5 to 2.0% linear shrinkage), it is essential that all volatile materials boiling below 200° C. (when measured at 760 millimicrons) be removed from the methyl vinylpolysiloxane convertible to the cured, solid, elastic state. This can be accomplished by heating the latter at a temperature of about 100° to 200° C., preferably under reduced pressure prior to incorporation therein of the fillers and peroxide. Means for accomplishing this removal of volatiles (which may consist of low molecular weight cyclic polydimethylsiloxanes) are found disclosed and claimed in Hatch and Blumenfeld application Serial No. 396,068, filed December 3, 1953, and assigned to the same assignee as the present invention.

The above molded compositions have linear shrinkages of about 1.5 to 2.0%, while the usual silicone rubbers now commercially available exhibit linear shrinkages ranging from about 3 to as high as 6 to 10% or more.

In order that those skilled in the art may better understand how the present invention may be practiced, the following examples are given by way of illustration and not by way of limitation. All parts are by weight.

The percent linear shrinkages were determined by measuring the width and length of the mold cavity, taking the average of the two dimensions (in millimeters), and then comparing the average dimensions of the heat-aged (24 hours at 250° C.) molded sheet with the average dimension of the mold cavity. The formula used is $$\text{Percent linear shrinkage} = \frac{\frac{l_1+l_2}{2} - \frac{l'_1+l'_2}{2}}{\frac{l_1+l_2}{2}} \times 100$$

where $l_1$ and $l_2$ are the linear dimensions of the mold, and $l'_1$ and $l'_2$ are the linear dimensions of the molded sheet.

EXAMPLE 1

100 parts octamethylcyclotetrasiloxane were mixed with 0.23 part of a hydrolyzate of methyl vinyldichlorosilane, which was composed of mixtures of cyclic methyl vinylpolysiloxanes of the formula $[(C_2H_3)(CH_3)SiO]_n$ where $n$ is a whole number equal to from 3 to 6. To this mixture was added about 0.001 part potassium hydroxide, and the mixture of ingredients was heated at about 150 to 170° C. for about one hour to obtain a highly viscous polymer composed of intercondensed dimethylsiloxy units and methyl vinylsiloxy units. This polymer was then washed with water (in the ratio of about 100 parts polymer to 10 parts water) on a doughmixer to remove essentially all the potassium hydroxide employed as catalyst. Thereafter the polymer was heated with water at a temperature of around 175 to 200° C. for several hours so as to steam strip the low boiling volatiles, until there was less than 0.3 to 1% volatiles when a one-gram sample thereof was heated for 30 minutes under vacuum of less than 5 mm. at 130° C. This low volatile-containing polymer was identified as "vinyl methylpolysiloxane."

EXAMPLE 2

100 parts of the methyl vinylpolysiloxane described in Example 1 were mixed with 52 parts of Hi-Sil X303 and 85 parts diatomaceous earth (Celite 350), both of which are more particularly described above. To this mixture of ingredients were added 0.68 part bis-(2,4-dichlorobenzoyl) peroxide and 0.2 part benzoyl peroxide. Other formulations were prepared employing the Hi-Sil X303 alone with the same devolatilized methyl vinylpolysiloxane and, in one instance, there was also employed a non-vinyl-containing methylpolysiloxane obtained by condensing octamethylcyclotetrasiloxane with KOH, and removing the KOH and devolatilizing the gum similarly as described above. Each of the samples was molded at about 140° to 150° C. for 15 minutes into the form of flat sheets, and thereafter the flat molded samples were further heated at 250° C. for 24 hours in an air-circulating oven, after which the linear shrinkages were determined as described above. The following Table I shows the formulations employed in each instance, as well as the percent linear shrinkage of each molded sample, and the physical properties of the sample coming within the scope of the present invention (sample No. 1).

*Table I*

| Ingredients (Parts) | Sample No. | | | |
|---|---|---|---|---|
| | 1 [1] | 2 | 3 | 4 |
| Devolatilized methyl vinylpolysiloxane | 100 | | 100 | |
| Devolatilized methylpolysiloxane | | 100 | | 100 |
| Hi-Sil X303 | 52 | 52 | 52 | 52 |
| Celite 350 | 85 | | | 85 |
| Bis-(2,4-dichlorobenzoyl) peroxide | 0.68 | 0.68 | 0.68 | 0.68 |
| Benzoyl peroxide | 0.2 | 0.2 | 0.2 | 0.2 |
| Properties: [2] | | | | |
| Linear shrinkage (percent) | 1.67 | 2.87 | 2.67 | 2.27 |
| Tensile strength p.s.i. | 1300 | | | |
| Percent elongation | 70 | | | |
| Percent compression set (22 hours at 177° C.) | 20 | | | |

[1] 80 Durometer.
[2] After 24 hours heat-aging.

EXAMPLE 3

In this example two formulations of different durometers were prepared employing the methyl vinylpolysiloxane gum described in Example 1. Each sample was molded and heat-treated as described in Example 2. The following Table II shows the formulations used as well as the properties of the molded products after the 250° C. heat aging.

*Table II*

| Ingredients (Parts) | Sample No. | |
|---|---|---|
| | 5 | 6 |
| Devolatilized methyl vinylpolysiloxane | 100 | 100 |
| Hi-Sil X303 | 37 | 40 |
| Celite 350 | 45 | 68 |
| Bis-(2,4-dichlorobenzoyl) peroxide | 2.0 | 2.0 |
| Properties: | | |
| Linear shrinkage percent | 1.6 | 1.6 |
| Tensile strength p.s.i. | 1100 | 1300 |
| Percent elongation | 120 | 90 |
| Durometer | 63 | 73 |
| Percent compression set (22 hours at 177° C.) | 12 | 14 |

It will, of course, be apparent to those skilled in the art that other minor variations in proportions of the ingredients described in the above-identified example may be employed without departing from the scope of the invention. It is critical that the combination of the two types of silica fillers of the specified particle size as well as the particular curing agent be employed in the narrow proportions recited if one is to obtain the above-described unexpected results. As is evident from an examination of Example 2, the omission of one of the fillers or the use of a convertible methylpolysiloxane free of silicon-bonded vinyl groups will not give the results described above.

In addition to the manufacture of gaskets which can be used in applications requiring close tolerances (and where resistance to lubricating oils and hydraulic fluids is desired), the compositions herein described can also be employed in making molded products such as enclosures or boots for various types of equipment where close tolerances are required and where it is desired to avoid the expense of making separate molds for the molding of the silicone rubber compositions in order to obtain those close tolerances.

What I claim as new and desire to secure by Letters Patent of the United States is:

1. A composition of matter exhibiting during molding low linear shrinkage comprising, by weight, (1) 100 parts of a methyl vinylpolysiloxane convertible to the cured, solid, elastic state containing about 2.0 to 2.005 total methyl and vinyl groups, from about 0.05 to 2% of the silicon atoms being connected to at least one and not more than two vinyl radicals by a carbon-silicon linkage, (2) a finely divided mixture of silica fillers composed of (a) a precipitated silica having an average particle diameter of from 20 to 25 millimicrons and a surface area of about 140 to 160 square meters per gram, and (b) a diatomaceous earth having an average particle diameter of between 1,000 to 6,000 millimicrons and having a surface area of about 15 to 30 square meters per gram, the total filler content comprising from 75 to 150 parts, the diatomaceous earth being present, by weight, in an amount equal to from about 60 to 85% of the weight of the precipitated silica, the said filler content and proportions of fillers varying with the hardness requirements of the cured product, and (3) from 0.5 to 2 parts bis-(2,4-dichlorobenzoyl) peroxide.

2. A composition of matter exhibiting during molding low linear shrinkage comprising, by weight, (1) 100 parts of a methyl vinylpolysiloxane convertible to the cured, solid, elastic state containing about 2.0 to 2.005 total methyl and vinyl groups, from about 0.05 to 2% of the silicon atoms being connected to at least one and not more than two vinyl radicals by a carbon-silicon linkage, (2) a finely divided mixture of silica fillers composed of (a) a precipitated silica having an average particle diameter of from 20 to 25 millimicrons and a surface area of about 140 to 160 square meters per gram, and (b) a diatomaceous earth having an average particle diameter of between 1,000 to 6,000 millimicrons and having a surface area of about 15 to 30 square meters per gram, the total filler content comprising from 75 to 150 parts, the diatomaceous earth being present, by weight, in an amount equal to from about 60 to 85% of the weight of the precipitated silica, the said filler content and proportions of fillers varying with the hardness requirements of the cured product, (3) from 0.5 to 2 parts bis-(2,4-dichlorobenzoyl) peroxide, and (4) from 0.05 to 1 part benzoyl peroxide.

References Cited in the file of this patent
UNITED STATES PATENTS

| | | |
|---|---|---|
| 2,666,041 | Pfeifer | Jan. 12, 1954 |
| 2,723,966 | Youngs | Nov. 15, 1955 |
| 2,816,089 | Willis | Dec. 10, 1957 |